United States Patent
Trombley

(10) Patent No.: US 10,554,006 B2
(45) Date of Patent: Feb. 4, 2020

(54) WIRE STRIPPING DIE FOR CRIMPING TOOL

(71) Applicant: Hubbell Incorporated, Shelton, CT (US)

(72) Inventor: Logan Trombley, Manchester, NH (US)

(73) Assignee: Hubbell Incorporated, Shelton, CT (US)

(*) Notice: Subject to any disclaimer, the term of this patent is extended or adjusted under 35 U.S.C. 154(b) by 303 days.

(21) Appl. No.: 15/400,549

(22) Filed: Jan. 6, 2017

(65) Prior Publication Data

US 2017/0201055 A1 Jul. 13, 2017

Related U.S. Application Data

(60) Provisional application No. 62/276,008, filed on Jan. 7, 2016.

(51) Int. Cl.
*H01R 43/05* (2006.01)
*H01R 43/042* (2006.01)

(52) U.S. Cl.
CPC .......... *H01R 43/05* (2013.01); *H01R 43/042* (2013.01)

(58) Field of Classification Search
CPC ...... A01B 19/02; B25B 27/10; H01R 43/042; H01R 43/0421; H01R 43/05
See application file for complete search history.

(56) References Cited

U.S. PATENT DOCUMENTS

| | | | |
|---|---|---|---|
| 1,022,679 A | 4/1912 | Huston | |
| 3,122,036 A | 2/1964 | Flower et al. | |
| 3,198,038 A | 8/1965 | Fleming | |
| 3,599,514 A | 8/1971 | Fornkahl | |
| 3,696,509 A | 10/1972 | Lancaster | |
| 4,117,749 A | 10/1978 | Economu | |
| 5,421,186 A * | 6/1995 | Lefavour | H01R 43/042 72/409.01 |
| 5,775,158 A * | 7/1998 | Hensley | B23D 23/00 30/180 |

(Continued)

FOREIGN PATENT DOCUMENTS

| | | |
|---|---|---|
| EP | 0780943 | 6/1997 |
| GB | 836587 | 6/1960 |

OTHER PUBLICATIONS

PCT/US2017/012522 International Search Report and Written Opinion dated Mar. 23, 2017 (13 pages).

*Primary Examiner* — Minh N Trinh
(74) *Attorney, Agent, or Firm* — Michael Best & Friedrich, LLP

(57) ABSTRACT

A wire stripping die is configured to be coupled to a crimping tool. The stripping die includes a die body, a first ridge, and a second ridge. The die body includes a first side, a second side, and a groove extending at least partially between the first side and the second side. The groove extends along an axis. The first ridge protrudes from a surface of the groove toward the axis by a first distance. The first ridge extends along at least a portion of the perimeter of the groove and extends at least partially around the axis. The second ridge protrudes from the surface of the groove toward the axis, and the second ridge extends parallel to the axis along at least a portion of the groove.

8 Claims, 13 Drawing Sheets

(56) References Cited

U.S. PATENT DOCUMENTS

| | | | | |
|---|---|---|---|---|
| 7,762,117 B2* | 7/2010 | Faucher | ............ | B25B 27/10 |
| | | | | 403/14 |
| 8,997,543 B2* | 4/2015 | Therrien | ............ | B21D 37/10 |
| | | | | 72/414 |
| 10,243,313 B2* | 3/2019 | Dinh | ............ | H01R 43/058 |
| 2017/0201055 A1* | 7/2017 | Trombley | ............ | H01R 43/042 |

* cited by examiner

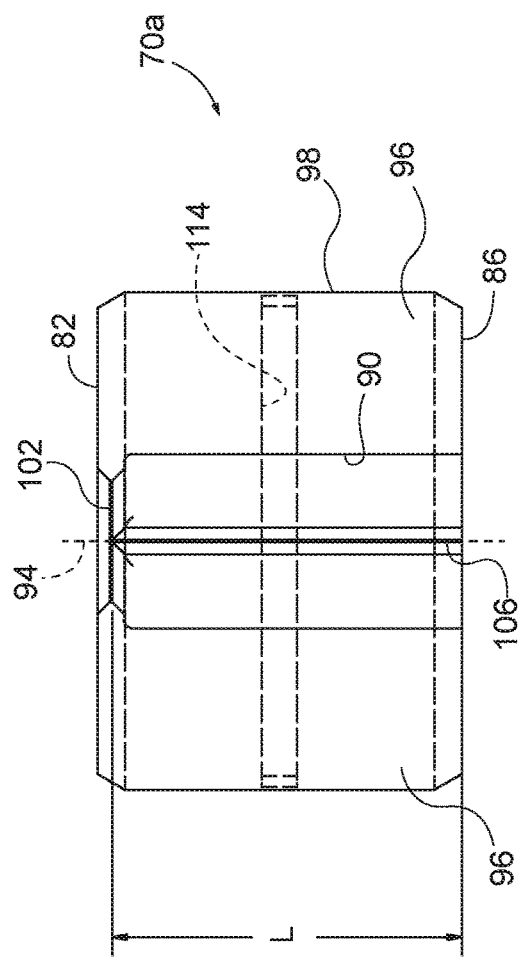
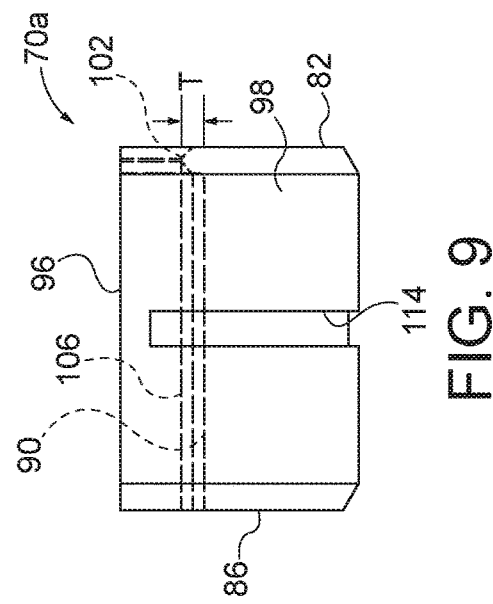
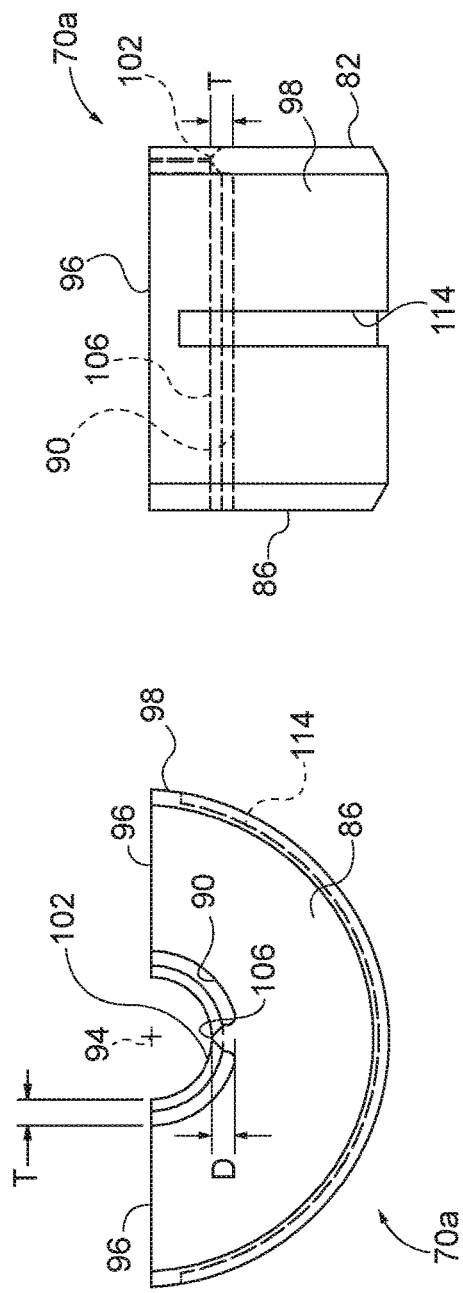
FIG. 7
FIG. 9
FIG. 8

WIRE STRIPPING DIE FOR CRIMPING TOOL

CROSS-REFERENCE TO RELATED APPLICATION

This application claims the benefit of previously-filed, U.S. Provisional Patent Application No. 62/276,008, filed Jan. 7, 2016, the entire contents of which are hereby incorporated by reference.

BACKGROUND

The present application relates to crimping tools, and particularly to a wire stripping die for a crimping.

SUMMARY

Insulated conducting wires may have various geometries (round, rectangular, etc.) and may be insulated with various materials. Stripping wire is frequently necessary and is a time-consuming task during installation of electrical connectors. Typically, large gauge conducting wires must be stripped by hand by carefully cutting the insulation material away from the bare conductor with a utility knife or wire-stripping hand tool.

In one aspect, a wire stripping die is configured to be coupled to a crimping tool. The stripping die includes a die body, a first ridge, and a second ridge. The die body includes a first side, a second side, and a groove extending at least partially between the first side and the second side. The groove extends along an axis. The first ridge protrudes from a surface of the groove toward the axis by a first distance. The first ridge extends along at least a portion of the perimeter of the groove and extends at least partially around the axis. The second ridge protrudes from the surface of the groove toward the axis, and the second ridge extends parallel to the axis along at least a portion of the groove.

In another aspect, a crimping tool includes a working head and a die defining a first side and a second side. The working head includes a frame and a jaw movable relative to the frame. The frame includes a first die holder, and the jaw including a second die holder. The jaw is movable relative to the first die holder. The die includes a pair of die portions. One of the die portions is removably coupled to the first die holder and the other of the die portions is removably coupled to the second die holder. Each die portion includes a groove, a first ridge, and a second ridge. The groove extends at least partially between the first side and the second side and extends along an axis. The first ridge protrudes from a surface of the groove toward the axis by a first distance. The first ridge extends along at least a portion of the perimeter of the groove and extends at least partially around the axis. The second ridge protrudes from the surface of the groove toward the axis, and the second ridge extends parallel to the axis along at least a portion of the groove.

In yet another aspect, a method for stripping an insulation material from a wire conductor includes: aligning the wire conductor with a first groove of a first die portion and a second groove of a second die portion, each of the first groove and the second groove extending parallel to an axis; moving the second die portion toward the first die portion, the first die portion including a first radial ridge extending along at least a portion of a perimeter of the first groove and extending at least partially around the axis, the first die portion including a first longitudinal ridge oriented parallel to the axis and extending along at least a portion of the first groove, the second die portion including a second radial ridge extending along at least a portion of a perimeter of the second groove and extending at least partially around the axis, the second die portion including a second longitudinal ridge oriented parallel to the axis and extending along at least a portion of the second groove, the first radial ridge, the second radial ridge, the first longitudinal ridge, and the second longitudinal ridge exerting a cutting force on the insulation material; and stripping the insulation material away from the wire conductor along the cuts formed by the first radial ridge, the second radial ridge, the first longitudinal ridge, and the second longitudinal ridge.

Other aspects of the application will become apparent by consideration of the detailed description and accompanying drawings.

BRIEF DESCRIPTION OF THE DRAWINGS

FIG. 7 is a plan view of the stripping die portion of FIG. 6.

FIG. 8 is a side view of the stripping die portion of FIG. 6.

FIG. 9 is a front view of the stripping die portion of FIG. 6.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect. Also, electronic communications and notifications may be performed using any known means including direct connections, wireless connections, etc.

Figure 1:
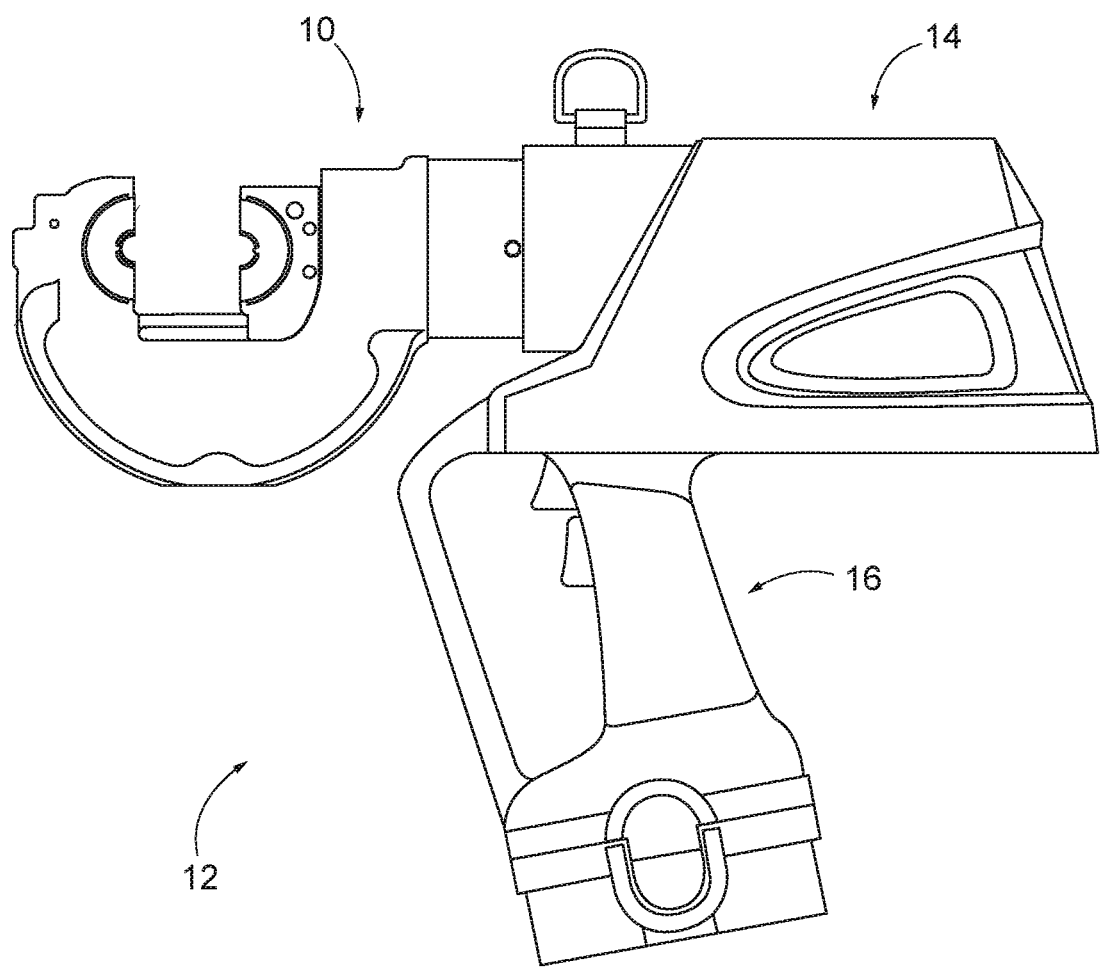
FIG. 1 is a side view of a crimping tool.
Figure 2:
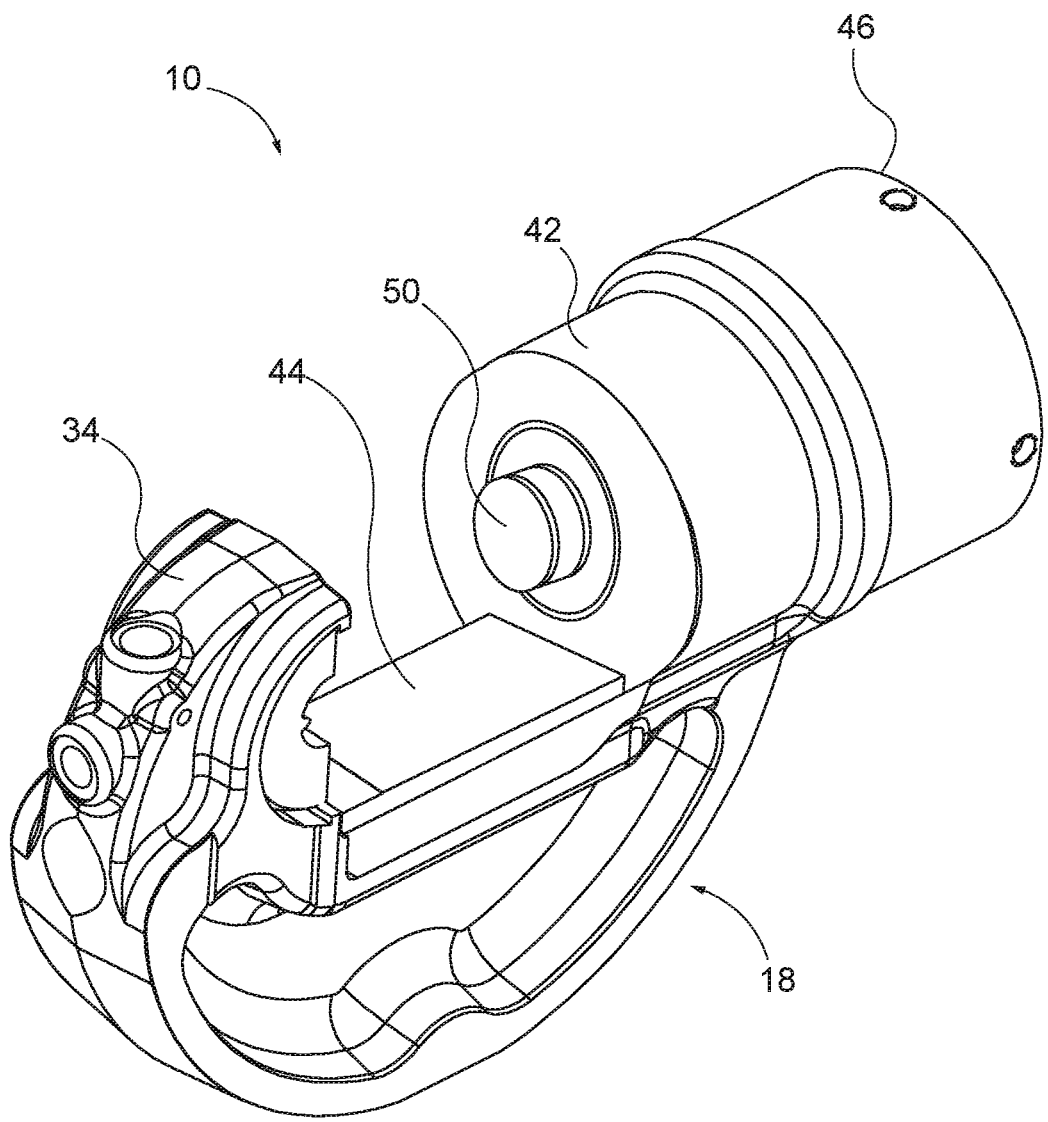
FIG. 2 is a perspective vim of a working head with a jaw removed.

FIGS. 1 and 2 illustrate a working head 10 for a tool, such as a crimping tool 12 (FIG. 1). The crimping tool 12 includes a housing 14 and a handle 16. In some embodiments, the crimping tool 12 is hydraulically operated. In other embodiments, the tool may be mechanically operated or the tool may be pneumatically operated. The crimping tool 12 may be a hand-held, battery-powered tool similar to the tool described in U.S. Pat. No. 7,762,117, issued Jul. 27, 2010, the entire contents of which are incorporated herein by reference. In addition, aspects of the tool 12 described below could be incorporated into other types of tools.

Figure 3:
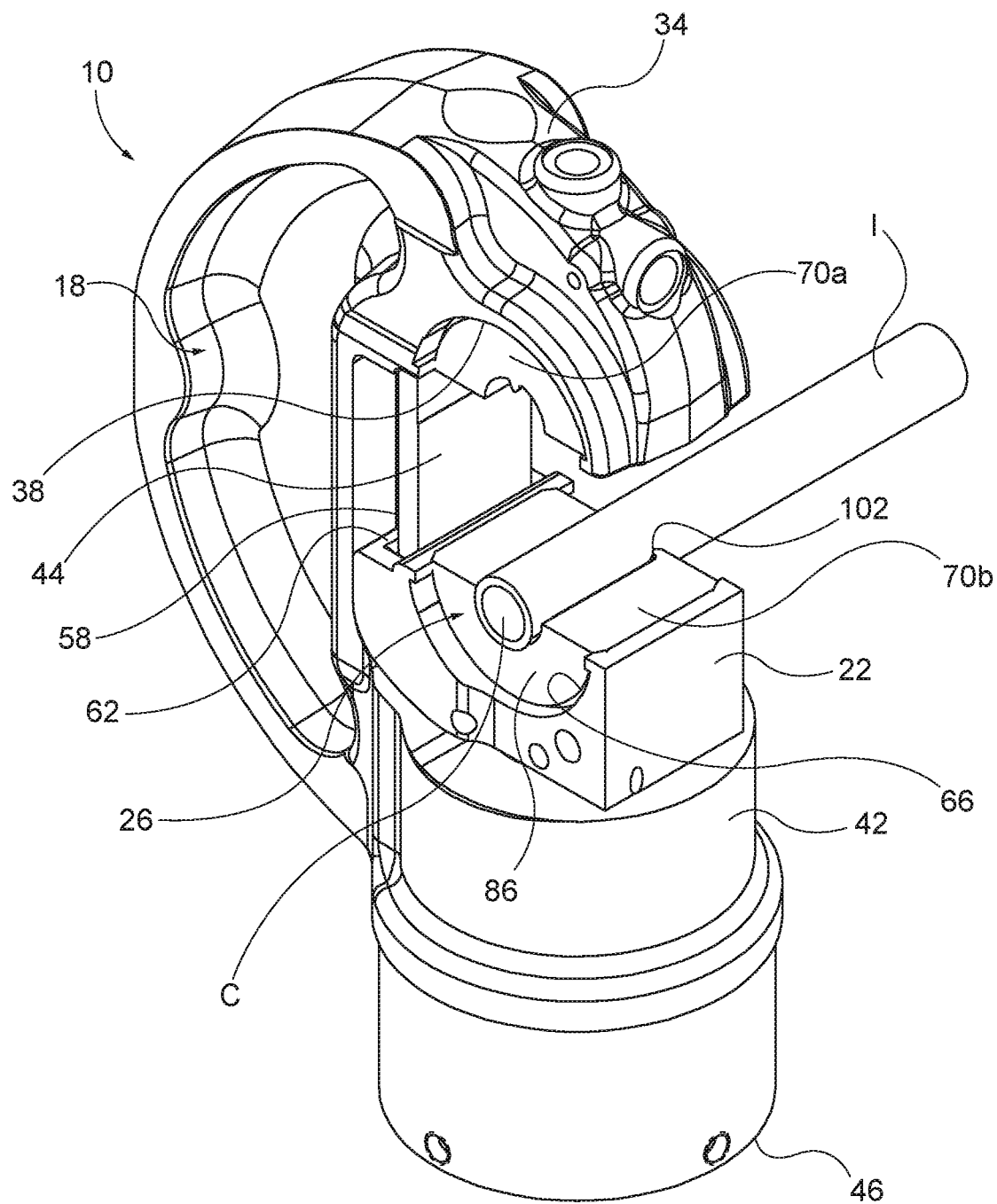
FIG. 3 is a perspective view of the working head of FIG. 2 and a conducting wire, with a jaw in an open position.
Figure 4:
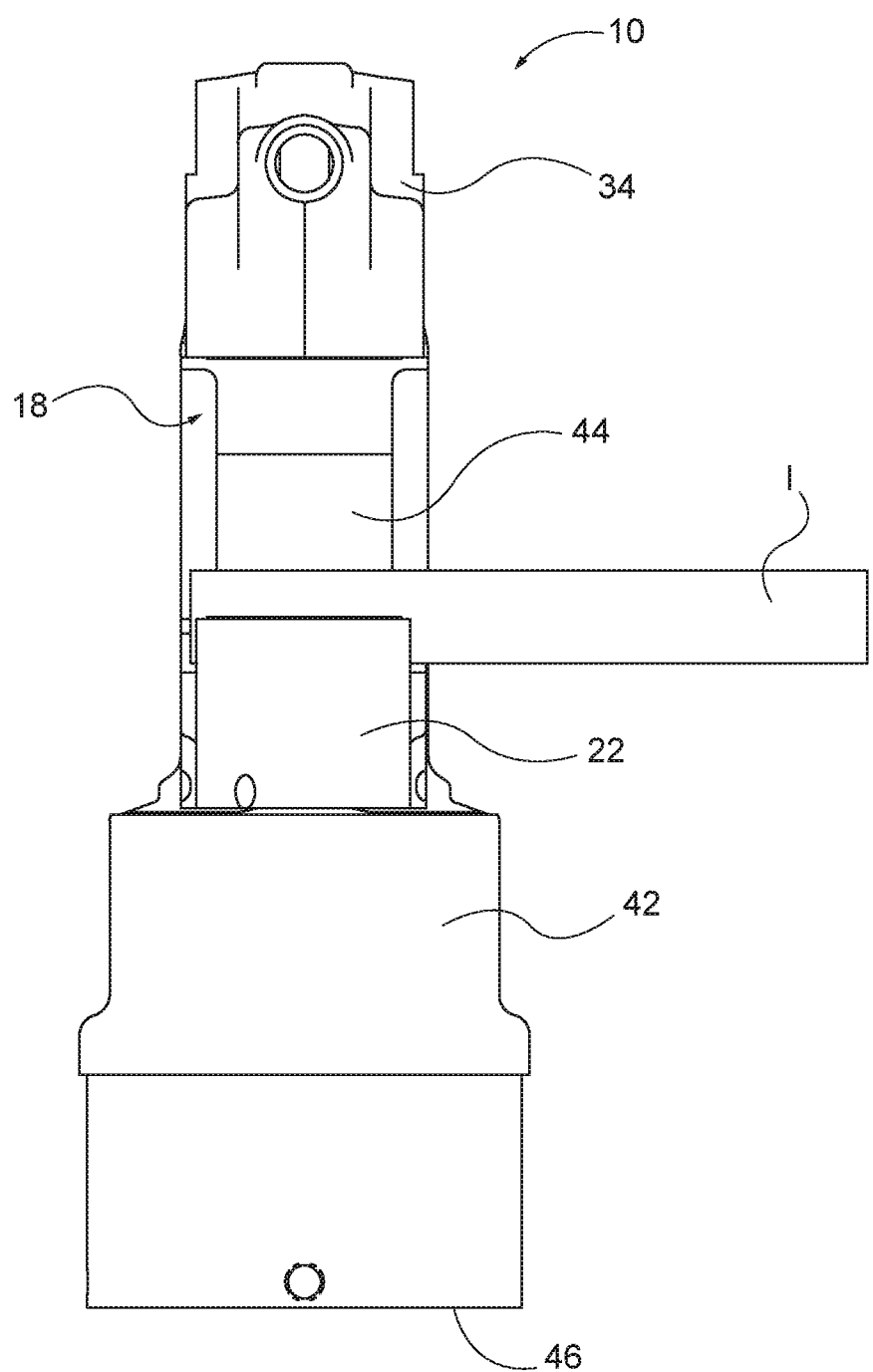
FIG. 4 is a front view of the working head and conducting wire of FIG. 3.
Figure 5:
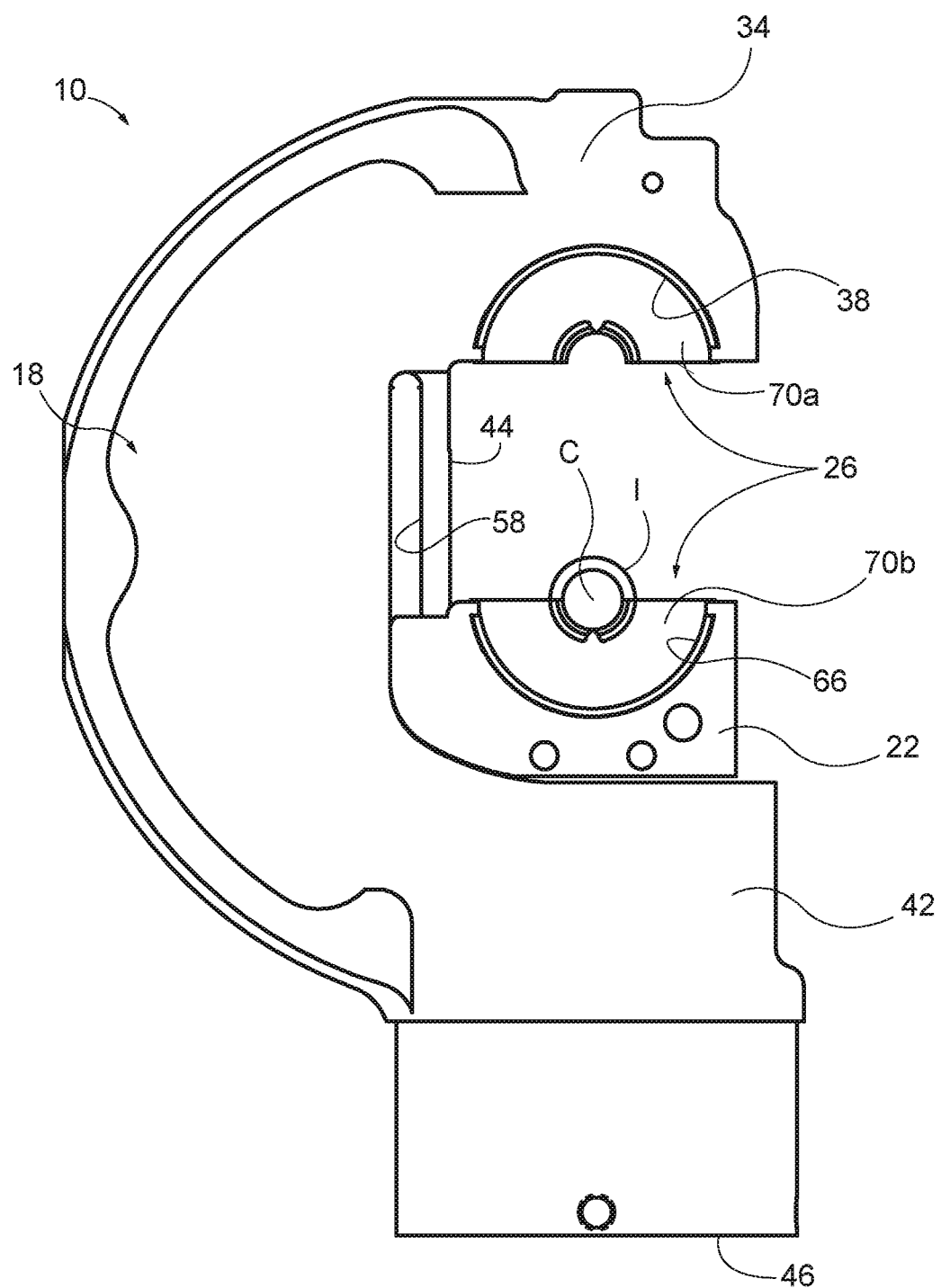
FIG. 5 is a side view of the working head and conducting wire of FIG. 3.

As shown in FIGS. 3-5, the working head 10 includes a frame or body 18, a movable jaw 22, and a stripping die 26. In the illustrated embodiment, the body 18 is generally formed in a C-shape, with an upper portion 34 including a first die holder 38 (FIGS. 3 and 5). The body 18 also includes a lower portion 42 and an intermediate portion 44 positioned between the upper portion 34 and the lower portion 42. The lower portion 42 includes an end 46 coupled to the housing 14 of the crimping tool 12 (FIG. 1), and the lower portion 42 also supports an actuator or ram 50 (FIG. 2). In the illustrated embodiment, an end of the ram 50 is coupled to the jaw 22, and extension of the ram 50 moves the jaw 22 toward the upper portion 34 of the body 18 while retraction of the ram 50 moves the jaw 22 away from the upper portion 34.

As shown in FIG. 3, the intermediate portion 44 includes a slot 58 extending at least partially between the upper portion 34 and the lower portion 42. The jaw 22 includes a protrusion 62 positioned within a slot 58. The protrusion 62 slides within the slot 58 as the jaw 22 moves toward the upper portion 34 and guides movement of the jaw 22 relative to the intermediate portion 44. The jaw 22 further includes a second die holder 66 positioned opposite the first die holder 38.

Referring to FIG. 5, the stripping die 26 includes a first or upper die portion 70a and a second or lower die portion 70b. The upper die portion 70a is removably coupled to the first die holder 38 of the upper portion 34 of the body 18, and the lower die portion 70b is removably coupled to the second die holder 66 of the jaw 22. In the illustrated embodiment, the die portions 70a, 70b are identical to one another and are oriented in a mirror relationship when coupled to the body 18 and jaw 22, respectively.

FIGS. 6-9 illustrate die portion 70a. Although aspects of only die portion 70a are illustrated in FIGS. 6-9 and described in detail below, it is understood that each die portion 70a, 70b includes similar features. The die portion 70a includes a first side 82, a second side 86 spaced apart from the first side 82, and a groove 90 extending between the first side 82 and the second side 86. The groove 90 extends along an axis 94, and extends partially around the axis 94. The groove 90 defines an axial length L (FIG. 7) measured parallel to the axis 94. The groove 90 further defines a perimeter measured along the surface of the groove 90 along an arc extending in a direction or plane perpendicular to the axis 94.

Figure 10:
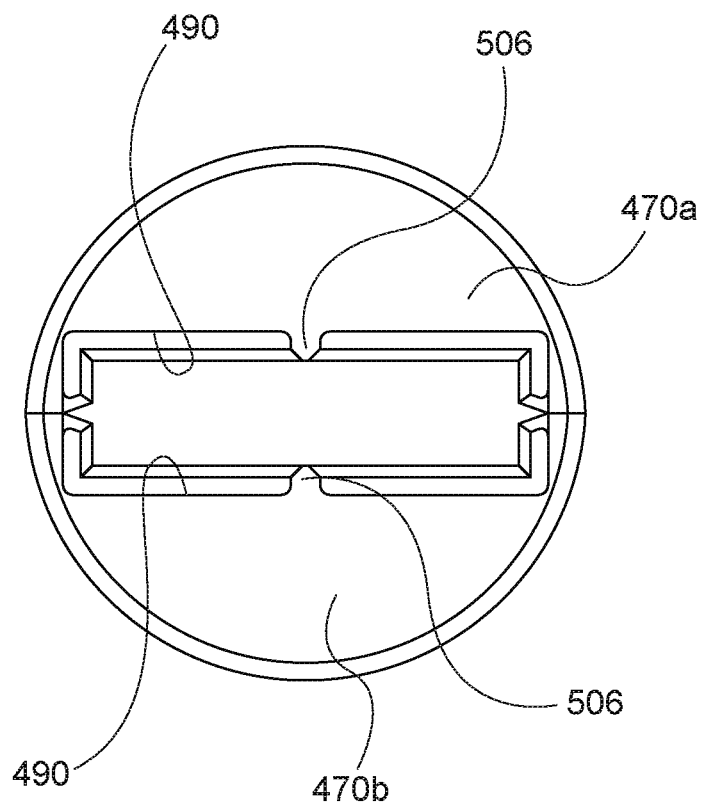
FIG. 10 is a side view of a stripping die portion according to another embodiment.
Figure 11:
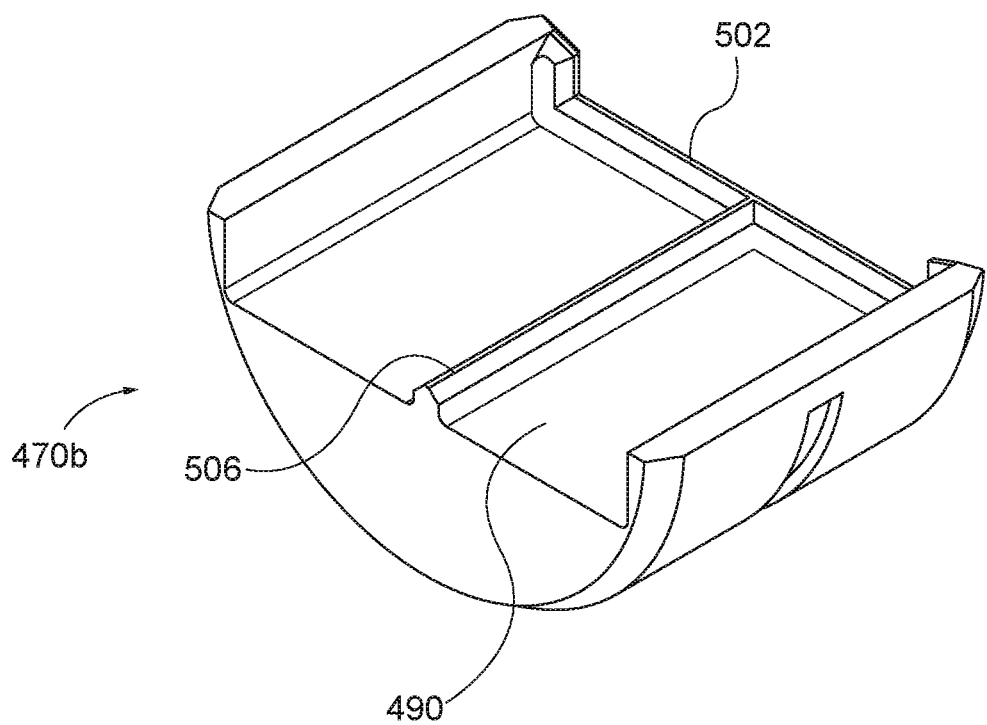
FIG. 11 is a perspective view of a stripping die portion according to another embodiment.

In the illustrated embodiment, the die portion 70a has a semi-circular shape with end surfaces 96 positioned in a common plane. An outer surface 98 extends between the end surfaces 96. In the illustrated embodiment, the groove 90 has a semi-circular shape and the outer surface 98 has a semi-circular shape. When the lower die portion 70b is brought into contact against the upper die portion 70a (FIG. 14), the grooves 90 of the die portions 70 are aligned and define an enclosed opening. In the illustrated embodiment, the enclosed opening has a circular shape. In other embodiments, the die portions may have a rectangular shape and the enclosed opening formed by the grooves may have a rectangular shape. In other embodiments, the die portions and the enclosed opening may form another type of shape (e.g., see the shape of die portion 870a of FIG. 13). In still other embodiments, the die portions may define a shape that is different from the enclosed opening. For example, FIGS. 10 and 11 illustrate die portions 470a, 470b having a semi-circular shape and a groove 490 having a rectangular shape.

Each die portion 70a, 70b further includes a first or radial ridge 102 (FIGS. 6-9) extending along the perimeter of the groove 90 in the plane perpendicular to the axis 94. The radial ridge 102 protrudes from the surface of the groove 90 toward the axis 94 by a distance T. The radial ridge 102 is positioned proximate an end of the groove 90 adjacent the first side 82. Each die portion 70a, 70b further includes a second or longitudinal or axial ridge 106 extending along the surface of the groove 90 in a direction parallel to the axis 94. The axial ridge 106 protrudes from the surface of the groove 90 toward the axis 94. In the illustrated embodiment, the axial ridge 106 extends a distance D that is equivalent to the distance T that the radial ridge 102 extends from the surface of the groove 90 toward the axis 94.

In the illustrated embodiment, the axial ridge 106 extends from one end of the groove 90 to the other end, from the second side 86 of the die portion 70a to the radial ridge 102. Also, in the illustrated embodiment, the axial ridge 106 is positioned such that the axial ridge 106 is in highest point (or the lowest point for die portion 70b) of the groove 90 when the die portion 70a is coupled to the first die holder 38. Stated another way, the end surfaces 96 of each die portion 70a, 70b define a plane that is coplanar with the axis 94, and the axial ridge 106 protrudes in a direction that is oriented perpendicular to the plane. In other embodiments, the axial ridge 106 may have a different length and/or may be positioned at a different location within the groove 90.

Figure 6:
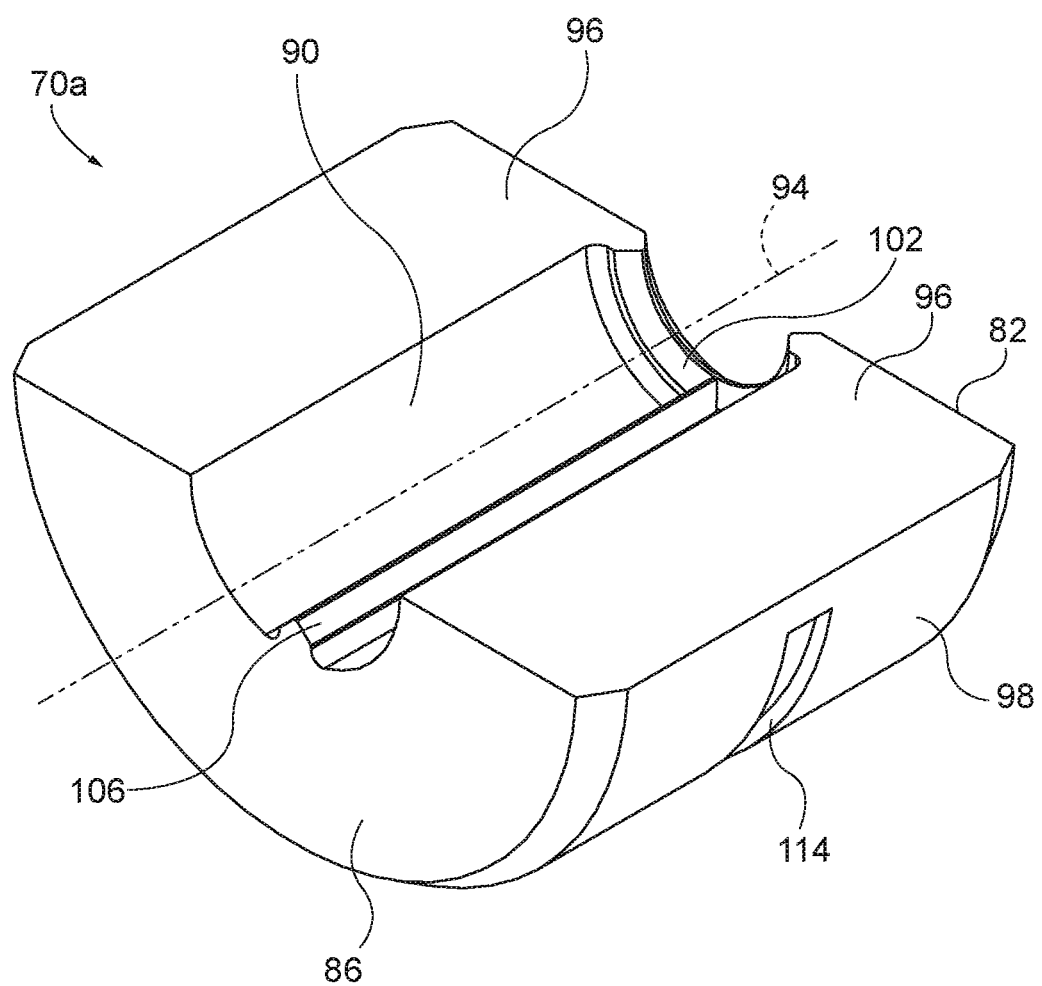
FIG. 6 is a perspective view of a stripping die portion.

As best shown in FIGS. 6 and 9, the die portion 70a further includes a locator or key 114 positioned on the outer surface 98 of the die portion 70a. In the illustrated embodiment, the key 114 is an elongated track extending along a portion of the length of the outer surface 98 between the end surfaces 96. The track is oriented generally parallel to the sides 82, 86 and positioned between the sides 82, 86. The track engages a projection (not shown) positioned in each die holder 38, 66 to position each die portion 70a, 70b within each respective die holder 38, 66.

Figure 12:
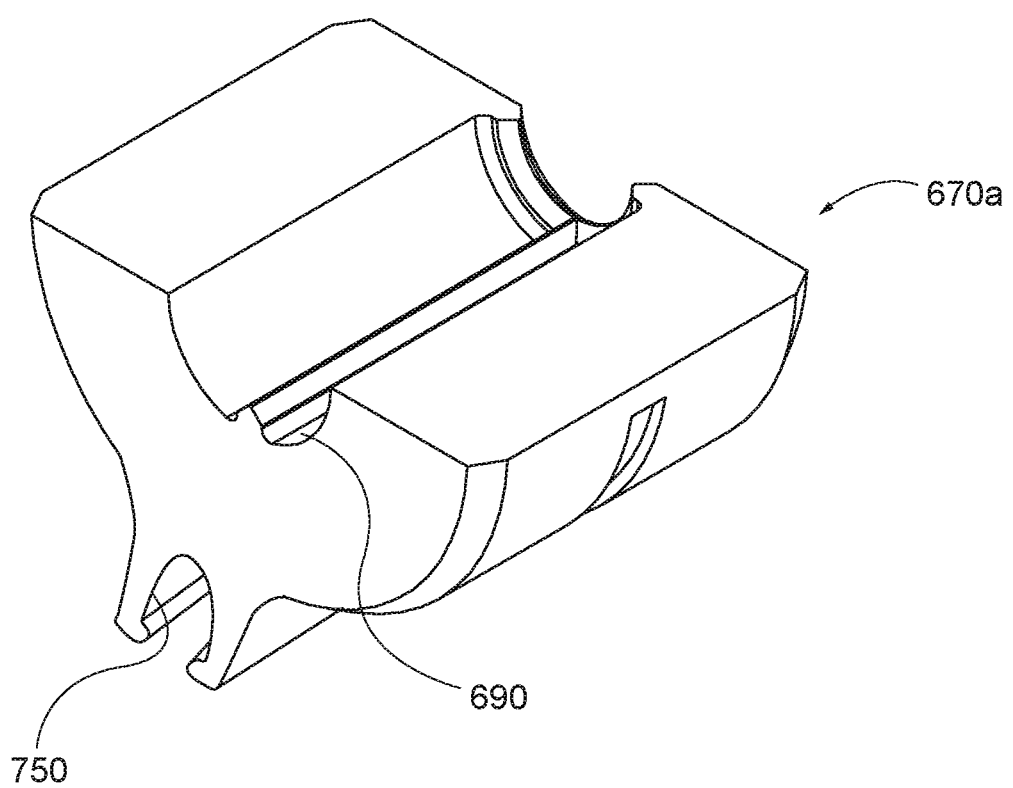
FIG. 12 is a perspective view of a stripping die portion according to another embodiment.
Figure 13:
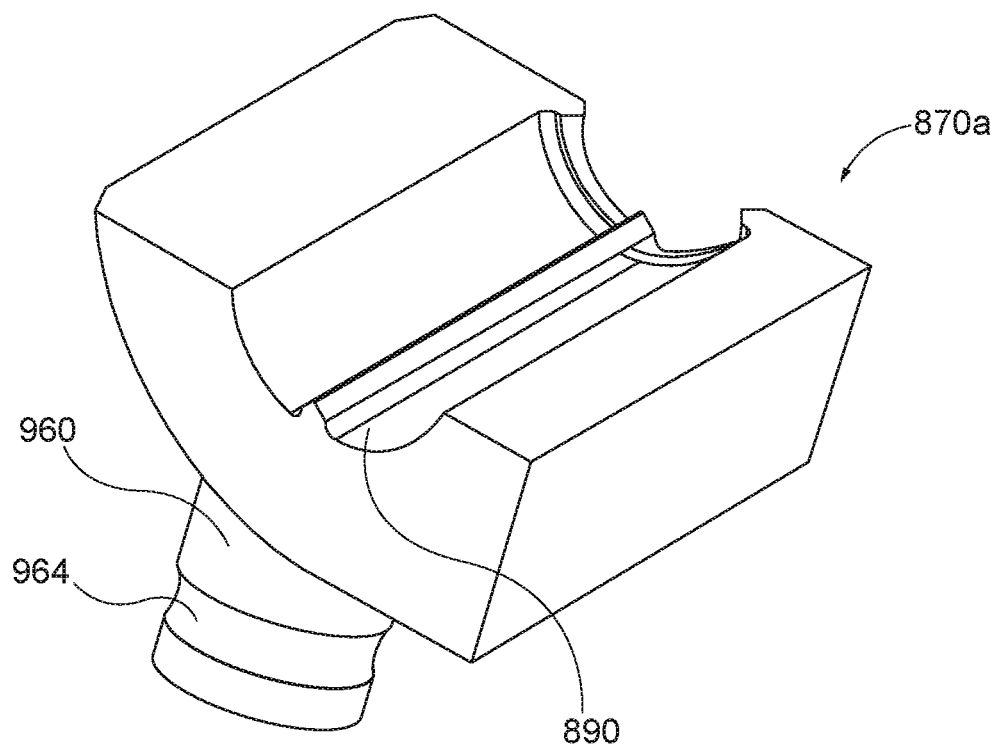
FIG. 13 is a perspective view of a stripping die portion according to another embodiment.

In other embodiments, the die portions 70 may be secured within the die holders in another manner. For example, FIG. 12 illustrates a die portion 670a including a slot 750 that engages a pin (not shown) positioned in the working head 10. FIG. 13 illustrates another embodiment in which each die portion 870a includes a pin 960 received within a channel (not shown) on the working head 110. The pin 960 includes a groove 964 that engages a boss (not shown) to secure the die portion 870a relative to the working head 10.

Figure 14:
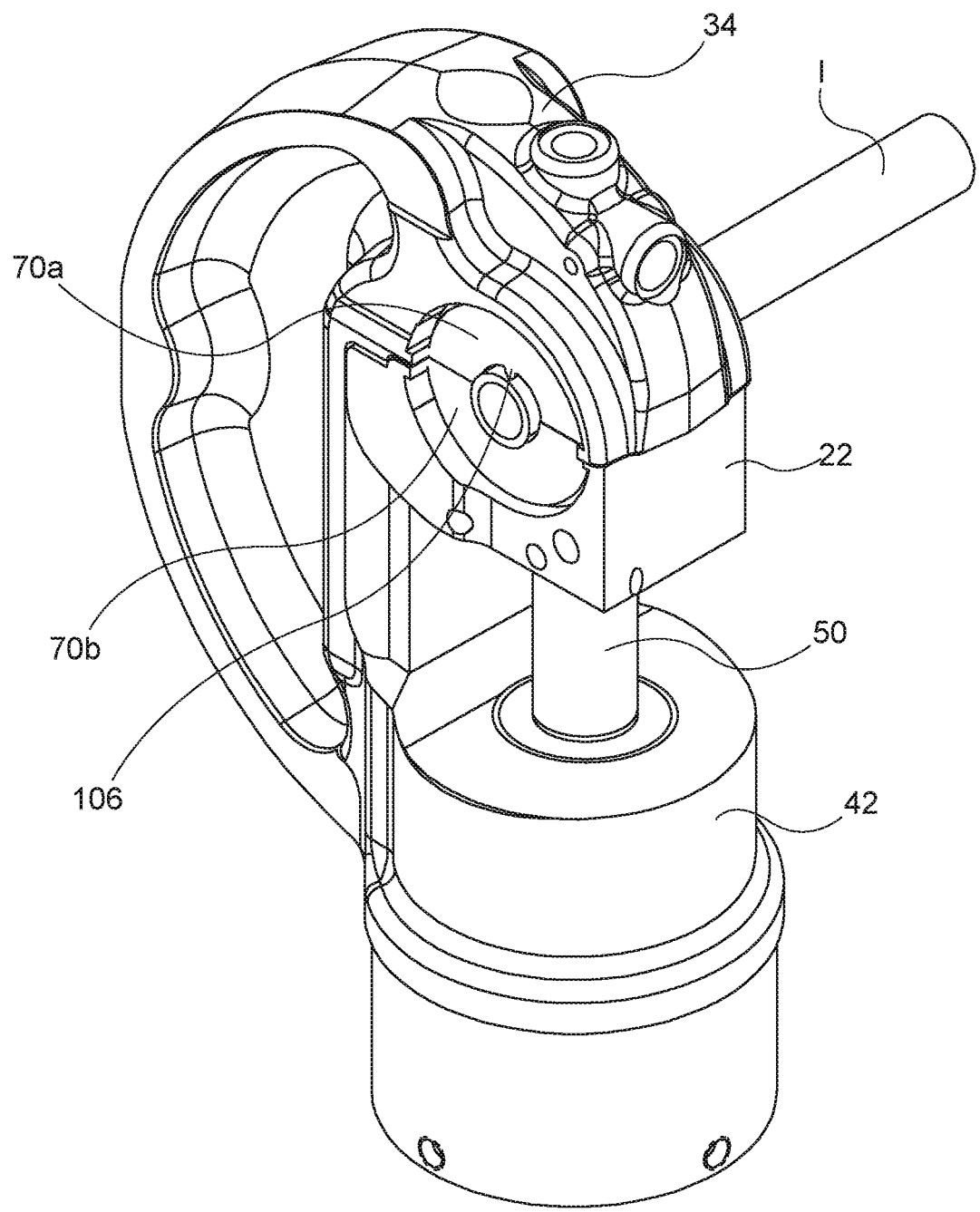
FIG. 14 is a perspective view of the working head and conducting wire of FIG. 3, with the jaw in a closed position.
Figure 15:
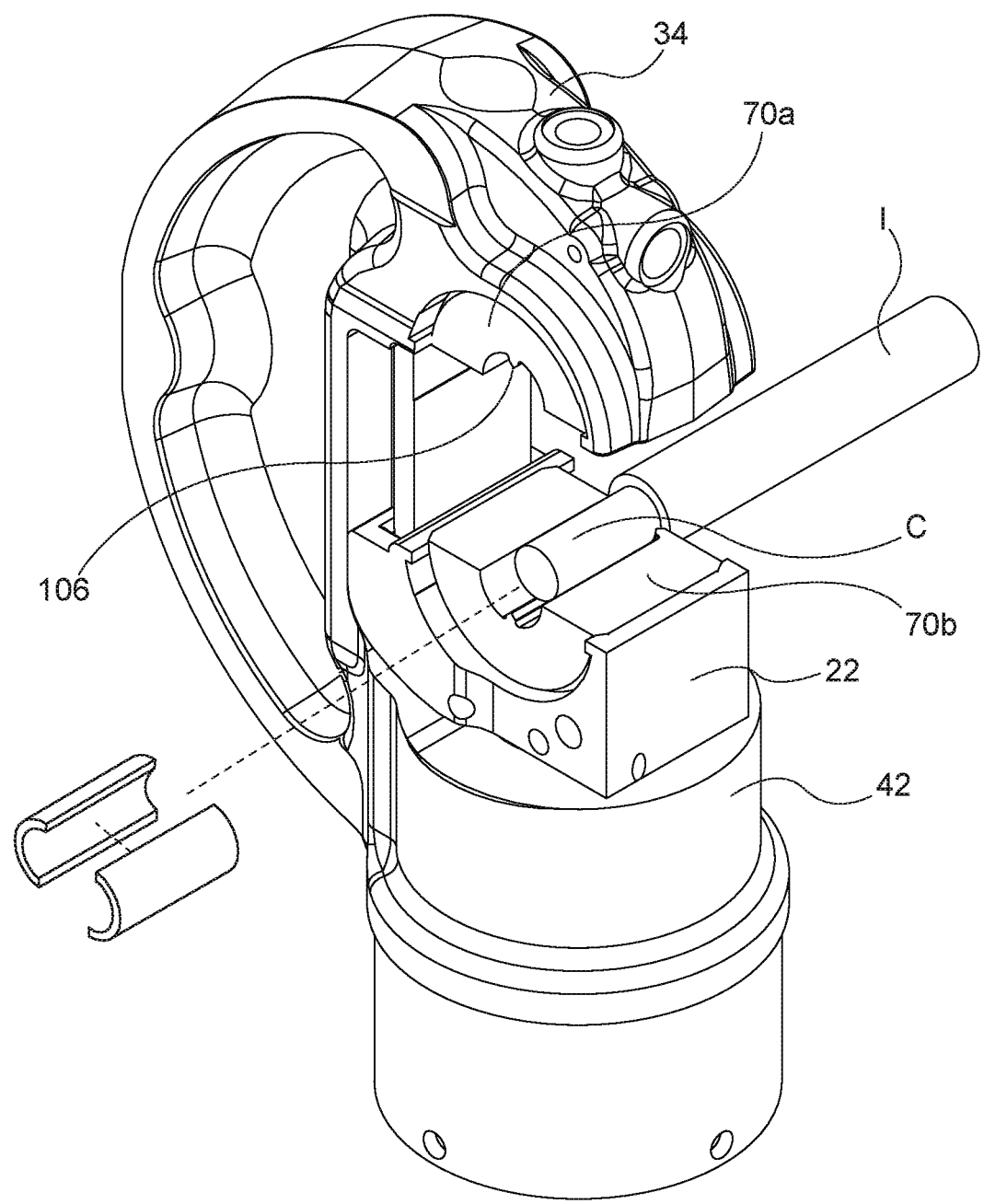
FIG. 15 is a perspective view of the working head and conducting wire of FIG. 14, with the jaw in the open position.

FIGS. 3, 14, and 15 illustrate the operation of the tool 12. Referring to FIG. 3, an insulated conducting wire is positioned between the die portions 70a, 70b supported in the upper portion 34 and the jaw 22. The conducting wire includes an insulation material I wrapped around a bare conductor C. The insulated portion of the conducting wire is inserted to a desired length depending on the length of insulation I that must be stripped. In one embodiment, the end of the insulated conducting wire is aligned with the second sides 86 of the die portions 70a, 70b (i.e., the sides of the die portions 70a, 70b opposite the radial ridge 102). As shown in FIG. 14, the ram 50 is actuated, moving the jaw 22 toward the upper portion 34 and causing the lower die portion 70b and upper die portion 70a to exert pressure on the insulation material I. The radial ridges 102 (FIG. 3) of the die portions 70a, 70b create a radial cut in the insulation material I around the axis 94, and the axial ridges 106 of the die portions 70a, 70b create longitudinal or axial cuts into the insulation material I. The height T (FIG. 8) of the radial ridge 102 defines the depth of the radial cuts, and the height D of the axial ridge 106 defines the depth of the axial cuts. As shown in FIG. 15, the jaw 22 is then retracted to the open position and the insulation material I enclosed by the cuts may be easily stripped away from the bare conductor C (e.g., by hand or with pliers).

In the illustrated embodiment, the groove 90 of each die portion 70a, 70b is sized and shaped to have a depth that is approximately equal to half the thickness of the bare conductor C. The groove 90 may be round or semi-circular to receive a portion of a conducting wire having a round or circular cross-section, or the groove 90 may be semi-rectangular to receive a portion of a conducting wire having a rectangular or square cross-section. In other embodiments, the groove may have another shape to accommodate conducting wires having a different shape. The radial ridges 102 of each die portion 70a, 70b protrude from the surface of the groove 90 by a distance T and the axial ridges 106 protrude by a distance D. In the illustrated embodiment, the distance T and distance D are approximately equal to the thickness of the insulation material I. Stated another way, the distance T and distance D may be approximately equal to the difference between the radius of the bare conductor C and the overall outer radius of the conducting wire including the insulation material I.

The stripping die 26 (FIG. 5) may be sized to fit into any existing crimping tool and may be used with hydraulic, mechanical, ratchet, or another type of crimping tool. The stripping die 26 can therefore reduce the time required to cut insulation material I from a conductor C, particularly for large gauge wires (e.g., wires having a diameter of ½ inch or larger) which typically require tedious cuts with a utility knife or wire-stripping hand tool. The radial ridges 102 and axial ridges 106 cut along both the longitudinal axis of the wire for the desired length needed to strip the insulation material I, and laterally to cut along the outer perimeter of the insulation material I. In addition, the die portions 70a, 70b can be changed depending on tubing and conductor sizes.

Although certain aspects have been described in detail with reference to certain preferred embodiments, variations and modifications exist within the scope and spirit of one or more independent aspects as described.

What is claimed is:

1. A crimping tool comprising:
   a working head including a frame and a jaw movable relative to the frame, the frame including a first die holder, the jaw including a second die holder, the jaw being movable relative to the first die holder; and
   a die defining a first side and a second side, the die including a pair of die portions, one of the die portions being removably coupled to the first die holder and the other of the die portions being removably coupled to the second die holder, each die portion including,
      a groove extending at least partially between the first side and the second side, the groove extending along an axis,
      a first ridge protruding from a surface of the groove toward the axis by a first distance, the first ridge positioned adjacent a first side of the die, the first ridge extending along at least a portion of the perimeter of the groove and extending at least partially around the axis, and
      a second ridge protruding from the surface of the groove toward the axis, the second ridge extending parallel to the axis along the groove continuously from the first ridge to the second side of the die.

2. The crimping tool of claim 1, wherein each of the die portions has a semi-circular shape.

3. The crimping tool of claim 1, wherein the groove has a semi-circular shape.

4. The crimping tool of claim 1, wherein the groove has a rectangular shape.

5. The crimping tool of claim 1, wherein the second ridge extends toward the axis by the first distance.

6. The crimping tool of claim 1, wherein the first distance is configured to be approximately equal to a thickness of an insulation material of a conducting wire.

7. The crimping tool of claim 1, wherein the die portions are oriented in a mirror relationship with respect to each other such that the groove of one of the die portions and the groove of the other of the die portions define an enclosed opening configured to receive a wire.

8. The crimping tool of claim 1, wherein the second ridge protrudes from the surface of the groove toward the axis by a distance that is equal to the first distance.

* * * * *